United States Patent
Billon

(10) Patent No.: US 6,636,736 B1
(45) Date of Patent: Oct. 21, 2003

(54) DEVICE FOR ALLOCATING RESOURCES IN A RADIOCOMMUNICATION NETWORK

(75) Inventor: Thierry Billon, Puteaux (FR)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/508,132

(22) PCT Filed: Sep. 11, 1998

(86) PCT No.: PCT/FR98/01952

§ 371 (c)(1),
(2), (4) Date: Jul. 13, 2000

(87) PCT Pub. No.: WO99/14964

PCT Pub. Date: Mar. 25, 1999

(30) Foreign Application Priority Data

Sep. 12, 1997 (FR) .............................................. 97 11468

(51) Int. Cl.⁷ ................................................. H04Q 7/20
(52) U.S. Cl. ........................ 455/447; 455/446; 455/449; 455/63.3; 455/62; 455/422.1; 370/328
(58) Field of Search ................................ 455/447, 446, 455/449, 63.3, 62, 422.1; 370/328

(56) References Cited

U.S. PATENT DOCUMENTS

| 5,285,447 A | * | 2/1994 | Hulsebosch ................. 370/332 |
| 5,557,657 A | * | 9/1996 | Barnett ........................ 455/444 |
| 5,974,323 A | * | 10/1999 | Doner ......................... 455/447 |
| 5,999,818 A | * | 12/1999 | Gilbert et al. ............... 455/448 |
| 6,091,955 A | * | 7/2000 | Aalto et al. ................. 455/447 |

* cited by examiner

Primary Examiner—William Trost
Assistant Examiner—Danh C Le
(74) Attorney, Agent, or Firm—Barnes & Thornburg

(57) ABSTRACT

A system for allocating a resource to a terminal in a cellular mobile radio network in which each cell of the network is identified by a primary color and a secondary color which correspond to transmission frequencies allocated to it, namely and respectively a set of primary frequencies (FP) and a set of secondary frequencies (FS) whose rate of re-use is higher than that of said primary frequencies (FP), and the terminal is connected to a local cell (A1). The system knows a potential level of interference (N) received by the terminal and allocates said resource to said terminal on a primary frequency (FP) or on a secondary frequency (FS) according to whether said potential level of interference (N) is respectively above or below a first distribution threshold (S1).

9 Claims, 1 Drawing Sheet

DEVICE FOR ALLOCATING RESOURCES IN A RADIOCOMMUNICATION NETWORK

Figure 1:
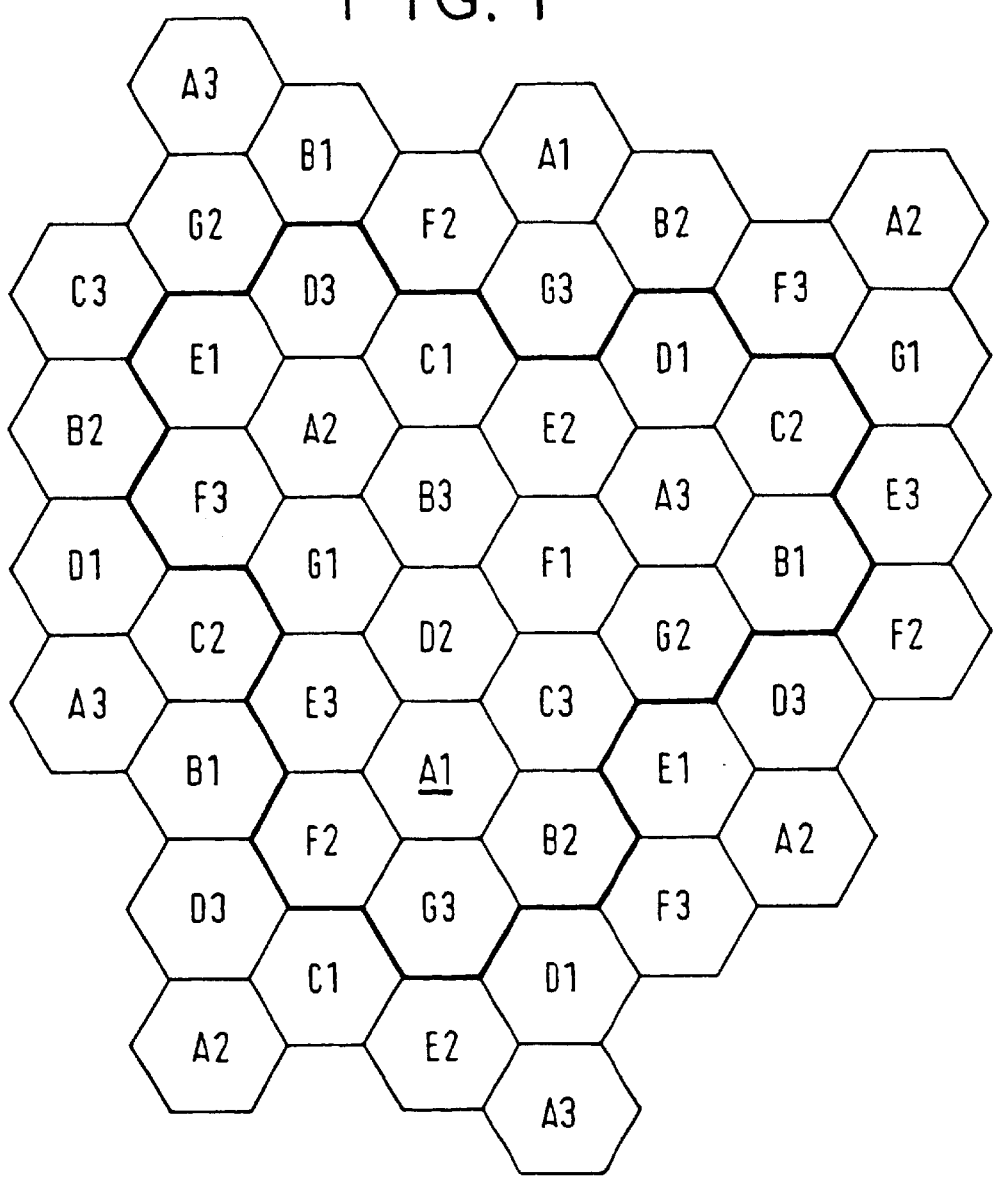

The present invention relates to a system for allocating resources in a cellular mobile radio network. The object is to select a radio channel to convey a call between a terminal and a base station of the network. Each cell has a base station. Thus a cell and its base station can be referred to interchangeably, so to speak.

One typical example of a cellular network is the GSM, now in widespread use. To simplify the following description, specific reference will be made to the GSM, but this is not limiting on the scope of the invention.

The field of the invention is therefore that of cellular networks. A cell uses transmission frequencies which are not used in any of the cells which are its near neighbors. Using the standard hexagonal representation of cells, any cell has six near neighbors.

In GSM networks, each cell has a beacon frequency referred to as BCCH and used in particular to set up the initial connection from a terminal to the network, i.e. to convey signaling information required by the terminal as soon as it is switched on.

It is therefore standard practice to employ a re-use pattern of twelve or even more cells for these beacon frequencies. To simplify the description of the invention, a pattern with seven cells is used here: a separate beacon frequency is allocated to each of the cells forming a pattern made up of a central cell and its six near neighbors. The most reliable solution, in terms of network operation, is naturally to use the same pattern of seven cells over all the available frequencies, and in particular over the traffic frequencies used for calls.

However, if the pattern with seven cells is applied to all the frequencies used in the network, the required number of calls in a cell cannot be supported. This is because the number of calls on each frequency is a network constant (with a value of one in FDMA systems or eight in the GSM). Also, the number of frequencies available in a cell falls as the rate of re-use falls. The rate of re-use is defined as the reciprocal of the number of cells in the re-use pattern.

The need to use a pattern with a higher rate of re-use for at least some traffic frequencies has therefore become apparent. A pattern with four cells has been used. A pattern with three cells has also been used, and has the highest rate of re-use in a cellular architecture where the use of the same frequency in two adjacent cells is prohibited. The pattern with three cells is formed by three adjacent hexagons having a common apex.

It follows from the foregoing considerations that the frequencies used in the network can be divided into primary frequencies and secondary frequencies. The primary frequencies, which conform to the pattern of re-use with seven cells, provide the required high quality of service and the secondary frequencies, which conform to a pattern with a higher rate of re-use, for example $1/3$, increase the volume of calls.

Any cell therefore has a set of primary frequencies and a set of secondary frequencies and each set comprises at least one frequency. The beacon frequency of a cell naturally belongs to its set of primary frequencies. For convenience, a cell is identified by a primary color and a secondary color which respectively correspond to the set of primary frequencies and to the set of secondary frequencies allocated to it.

When the terminal is in standby mode, i.e. when it is logged onto the network and is awaiting a call, it is connected to a local cell by a standby channel referred to as the SDCCH. When a call involving the terminal is set up, the network must select an available resource in the local cell.

If that resource is selected at random, or in accordance with inappropriate criteria, especially if the network is heavily loaded, it may not support a call of sufficient quality, in particular from the point of view of the terminal. This situation will initiate a change of resource, with the aim of finding a new channel which is better for the terminal concerned. It is naturally preferable to avoid this procedure, which is referred to as "handover", since it increases signaling within the network, which becomes increasingly undesirable as the load on the network increases. Moreover, if the resource initially selected proves to be of mediocre quality, this is very probably because it is being used for other calls which have already been set up and which are interfering with the call of the terminal in question, which terminal will itself naturally interfere with those other calls. For the same reason, this will in turn lead to the risk of new handovers.

The problem of choosing a resource therefore arises at the time of the initial allocation, i.e. at the time of call set-up, and also at the time of handover. In this latter case it is a matter of finding a new resource.

Thus an object of the present invention is a system for allocating to a terminal a resource whose potential quality is high.

The system of the invention is used in a cellular mobile radio network in which each cell of the network is identified by a primary color and a secondary color which correspond to transmission frequencies allocated to it, namely and respectively a set of primary frequencies and a set of secondary frequencies whose rate of re-use is higher than that of the primary frequencies, and the terminal is connected to a local cell. The system knows a potential level of interference received by said terminal and allocates said resource to the terminal on a primary frequency or on a secondary frequency according to whether said potential level of interference is respectively above or below a first distribution threshold.

The environment of the terminal is therefore taken into account in selecting the resource. This avoids choosing a frequency that the terminal receives at a relatively high level.

The system advantageously knows a cumulative probability of said potential level of interference and fixes the first distribution threshold by comparing said cumulative probability with the ratio of the number of resources of the set of primary frequencies to the total number of resources.

This optimizes the first distribution threshold allowing for the frequencies available in the cell.

The set of primary frequencies of the local cell includes a beacon frequency and at least one traffic frequency and the system allocates said resource to the terminal on said traffic frequency or on the beacon frequency according to whether the potential level of interference is respectively above or below a second distribution threshold.

This is an improvement to the basic principle of the invention.

The system therefore preferably knows a cumulative probability of said potential level of interference and preferably fixes the second distribution threshold by comparing said cumulative probability with the ratio of the number of traffic frequency resources of the set of primary frequencies of the local cell to the total number of resources.

In a first embodiment of the system the terminal measures the levels received from a particular number of adjoining cells which have a different primary color to the local cell and the system knows the number of adjoining cells identified as having the same secondary color as the local cell and establishes the potential level of interference by means of an increasing function of that number.

In a second embodiment of the system, the terminal measures the levels received from a particular number of adjoining cells which have a different primary color to that of the local cell, and the system produces the potential level of interference by summing the levels received from adjoining cells with the same secondary color as the local cell.

In this case, if the system also knows the levels received by the terminal from surrounding cells identified as using secondary frequencies adjacent those of the local cell, the network being designed so that a received adjacent frequency is allocated a predetermined attenuation coefficient, the potential level of interference is increased by the product of that attenuation coefficient and the sum of the levels received from said surrounding cells.

This refines the estimated level of interference.

The potential level of interference is advantageously weighted by the level received by the terminal from the local cell.

If the network has a separate beacon frequency in each set of primary frequencies the level received from one of the adjoining cells is preferably measured on the beacon frequency allocated to it.

The invention is highly beneficial for initial allocation of the resource when a call is set up with the terminal.

The invention is of great benefit for initially allocating the resource on setting up a call with the terminal.

Figure 2:
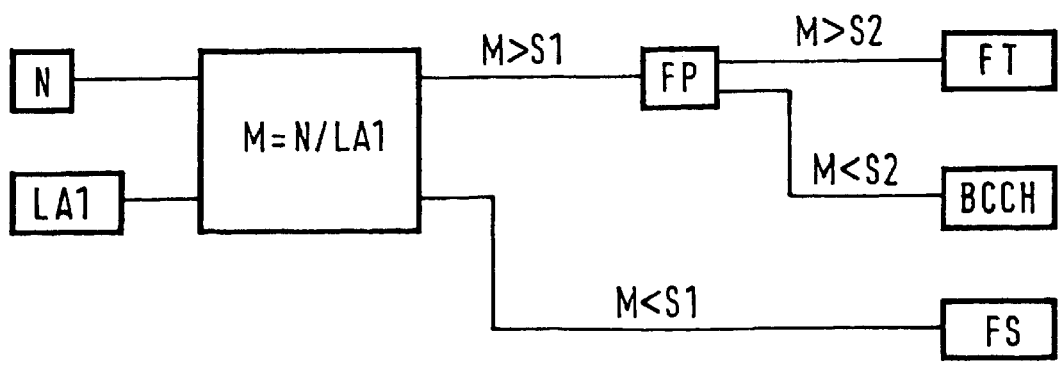

The present invention emerges more clearly in the course of the following description of embodiments of the invention, which is given by way of illustrative example and with reference to the accompanying drawings, in which:

FIG. 1 is a block diagram showing part of a network, and
FIG. 2 is a block diagram of the system.

The description of the invention given hereinafter with reference to FIG. 1 refers to a hexagonal representation of a cellular network.

The sets of primary frequencies follow a pattern of re-use with seven cells. Each set is identified by a letter from A to G and comprises at least one frequency, the BCCH frequency in the case of the GSM. The sets of secondary frequencies conform to a pattern of re-use with three cells. Each set is identified by a digit from 1 to 3 and comprises at least one frequency, generally a traffic frequency.

Each cell can therefore be identified by a primary color (a letter) and a secondary color (a digit) which respectively represent the set of primary frequencies and the set of secondary frequencies allocated to the cell.

The combination of the two patterns of re-use defines a new pattern with twenty-one cells, outlined with a thicker line in the figure. The required coverage of the network is obtained by repeating the new pattern in translation.

Assume that a terminal is listed in the cell A1 which is part of the pattern with twenty-one cells outlined with a thicker line. The cell A1 is therefore the local cell of the terminal, which is either in call mode or in standby mode.

At the request of the network, and in particular to prepare for handover in the event of failure of the link with the local cell, the terminal measures the level received from some identified neighboring cells on one of the frequencies of the set of primary frequencies B, C, D, E, F, G allocated to them. In the case of the GSM, that frequency is preferably the BCCH frequency. With reference to radio propagation conditions, the concept of adjoining cells must be understood in a very broad sense. The cells concerned are in fact those which are received best. It is further apparent that the cell could itself analyze the adjoining cells without the network instructing it to do so.

Note that the first rank cells geographically nearest the local cell are designated B2, C3, D2, E3, F2 and G3. Note also that, because of the structure of the network, there are twelve second rank cells adjacent the first rank cells and they are designated B1, D3, C1, E2, D1, F3, E1, G2, F1, B3, G1 and C2. Thus none of the first eighteen first or second rank cells has the same primary color and the same secondary color as any other cell. On the other hand, of those eighteen cells, six triplets have the same primary color.

The problem therefore arises of knowing whether the signal received on a primary frequency, for example that of the set F, comes from the nearest cell F2 or from one of the second rank cells F1, F3. This is because there may be an obstacle to propagation between the terminal and any of the three cells F1, F2, F3.

A simple solution to this problem is to have the cells broadcast their secondary color on the primary frequency to be evaluated by the terminal, enabling the terminal to identify the source of the primary frequency.

The terminal therefore knows the primary color and the secondary color of the cell that sent the signal whose level it has measured. Assume that the six level measurements LB2, LC3, LD2, LE1, LG2, LF1 come from the cells B2, C3, D2, E1, G2, F1, respectively.

In a first embodiment of the invention, it is accepted that the potential level of interference N as seen from the terminal increases as the number of adjoining cells E1, F1 having the same secondary color as the local cell A1 increases. A solution which has the merit of being very simple is to choose for the level of interference N the number of the adjoining cells which have the same secondary color, which is two in this instance. More generally, it is necessary to adopt for the level of interference N an increasing monotonic function of the number of adjoining cells having the same secondary color as the local cell A1.

In a second embodiment of the invention the potential level of interference N1 is equal to the sum of the levels (LE1+LF1) received from adjoining cells with the same secondary color as the local cell A1.

Moreover, because a pattern of re-use with three cells is used for the sets of secondary frequencies, the situation is the usual one in which at least one frequency of any set of secondary frequencies is adjacent at least one frequency of each of the other two sets.

It is beneficial to add the interference N2 caused by links using adjacent frequencies to the potential level of interference. This is because the channel filter is not perfect and when the terminal is tuned to a selected frequency it also receives adjacent frequencies, subject to an attenuation coefficient $\alpha$.

If N denotes the potential level of interference:

N1=LE1+LF1
N2=$\alpha$(LB2+LC+LD2+LG2)
N=N1+N2

Also, the terminal generally measures the level LA1 of the signal received from the local cell A1. In standby mode, this signal is generally the one used to maintain the connection between the terminal and the network, in particular if a call request intervenes. In the case of the GSM, this signal constitutes a signaling channel referred to as the SDCCH.

In this case it is advantageous to weight (i.e. to divide) the potential level of interference N by the level LA1 received from the local cell A1. This is because the interference problem becomes less severe as the received signal level increases. If M denotes the weighted level:

$$M = N/LA1$$

Note that the weighted level P is analogous to the reciprocal of a carrier-to-interference ratio.

Referring to FIG. 2, the system of the invention compares either the potential level of interference N or the weighted level M with a first distribution threshold S1, the nature of which is explained below.

If the level is below the threshold S1, the system allocates a resource to the terminal on a primary frequency FP. Otherwise it allocates a resource on a secondary frequency FS.

This is because, having a lower rate of re-use, the primary frequencies FP offer a generally better quality of service than the secondary frequencies FS.

If there is only one primary frequency, it is normally the beacon frequency of the local cell. On the other hand, some cells have a plurality of primary frequencies and in this case it is beneficial to provide a second distribution threshold S2.

The system then compares the potential level of interference N or the weighted level M to this second threshold S2. If the level is below the threshold S2 it allocates a resource to the terminal on the beacon frequency. Otherwise it allocates a resource on another primary frequency FT.

This is because the beacon frequency is routinely transmitted continuously at full power but the traffic frequencies are not subject to the same constraints and can withstand power regulation and discontinuous transmission of speech. It clearly follows that the traffic frequencies in the set of primary frequencies will necessarily provide a better quality of service than the beacon frequency.

Like most of the thresholds used in a network, the first distribution threshold S1 can be fixed according to the characteristics of the network.

In the first embodiment of the invention, the potential level of interference N is equal to the number of adjoining cells which have the same secondary color as the local cell A1.

For example, if there are one primary frequency and three secondary frequencies, the first distribution threshold S1 can be fixed at one. In other words, a terminal which receives at least two adjoining cells with the same secondary color as the local cell is then allocated a resource on the primary frequency.

If there are two primary frequencies FP and four secondary frequencies FS, the first distribution threshold S1 can be fixed at one and the second distribution threshold S2 would have the value two.

Likewise, in the second embodiment, it is the weighted level M which is retained as the selection criterion. In this case the first and second distribution thresholds S1 and S2 can be −2 dB and +2 dB, respectively.

It is nevertheless preferable to determine the distribution threshold(s) as a function of the real behavior of the network.

To this end, the system of the invention stores the potential level of interference N or the weighted level M for each terminal as they log onto the local cell.

After that, it establishes a statistic in the form of a probability density representing the distribution or frequency of occurrence of that level. This statistic is naturally inversely proportional to the number of observations. It is therefore prudent, when switching on the system, to initialize the statistic to a function approximately representing the average behavior of the network.

That probability density provides the cumulative probability N, M as a function of a variable S, probability that this level will be above S:

$$P(N>S) \text{ or } P(M>S).$$

S is determined as a function of the resources of the cell. If $r_{11}$, $r_{12}$, $r_2$ respectively denote the number of resources of the BCCH frequency, the primary frequencies used as traffic frequencies FT and the secondary frequencies FS, then the distribution thresholds S1, S2 can be as follows:

First distribution threshold S1:

$$\text{Compute ratio } R1 = 1 - \frac{r_{11} + r_{12}}{r_{11} + r_{12} + r_2}$$

Compute S1 from the cumulative probability such that P(N>S1) or P(M>S1) is equal to R1.

Second distribution threshold S2:

$$\text{Compute ratio } R2 = 1 - \frac{r_{12}}{r_{11} + r_{12} + r_2}$$

Compute S2 from the cumulative probability such that P(N>S2) or P(M>S2) is equal to R2.

It is naturally not essential to use the second distribution threshold S2. This applies in particular if the beacon frequency is the only primary frequency and $r_{12}$ therefore has the value zero.

The above description covers one preferred embodiment of the invention. The skilled person will nevertheless understand that other solutions are available within the scope of the present invention, in particular through the use of equivalent means.

What is claimed is:

1. A system for allocating a resource to a terminal in a cellular mobile radio network in which each cell of the network is identified by a primary color and a secondary color which correspond to transmission frequencies allocated to it, namely and respectively a set of primary frequencies (FP) and a set of secondary frequencies (FS) whose rate of re-use is higher than that of said primary frequencies (FP), and the terminal is connected to a local cell (A1), in which the system knows a potential level of interference (N) received by the terminal and allocates said resourse to said terminal on a primary frequency (FP) or on a secondary frequency (FS) according to whether said potential level of interference (N) is respectively above or below a first distribution threshold (S1), and in which the system knows a cumulative probability (P (N>S)) of said distribution threshold (S1) by comparing said cumulative probability with the ratio of the number of resources of said set of primary frequencies to the total number of resources.

2. A system according to claim 1, in which the set of primary frequencies of said local cell includes a beacon frequency (BCCH) and at least one traffic frequency (FT) and the system allocates said resource to said terminal on said traffic frequency (FT) or on said beacon frequency according to whether said potential level of interference (N) is respectively above or below a second distribution threshold (S2).

3. A system according to claim 2, in which the system fixes said second distribution threshold (S2) by comparing said cumulative probability with the ratio of the number of traffic frequency resources of the set of primary frequencies of said local cell to the total number of resources.

4. A system according to any preceding claim, in which said terminal measures the levels received from a particular number of adjoining cells (B2, C3, D2, E1, G2, F1) which have a different primary color to said local cell (A1) and the system knows the number of adjoining cells. (W1, F1) identified as having the same secondary color as the local cell (A1) and establishes said potential level of interference (N) by means of an increasing function of that number.

5. A system according to any one of claims 1 to 3 in which said terminal measures the levels received from a particular number of adjoining cells (B2, C3, D2, E1, G2, F1) which have a primary color different to that of said local cell (A1) and the system produces said potential level of interference (N) by summing the levels received from adjoining cells (E1, F1) with the same secondary color as said local cell.

6. A system according to claim 5, in which the system also knows levels received by the terminal from surrounding cells (B2, C3, D2, G2) identified as using secondary frequencies adjacent those of said local cell (A1), the network being designed so that a received adjacent frequency is allocated to a predetermined attenuation coefficient, and said potential level of interference (N) is increased by the product of that attenuation coefficient and the sum of the levels received from said surrounding cells.

7. A system according to claim 1, in which said potential level of interference (N) is weighted by the level received by the terminal from said local cell (A1).

8. A system according to claim 1, in which the network has a separate beacon frequency in each set of primary frequencies and the level received from one of said adjoining cells is measured on the bacon frequency allocated to it.

9. A system according to claim 1, in which it allocates said resource when a call is set up with the terminal.

* * * * *